United States Patent [19]
Kuddes

[11] Patent Number: 5,638,410
[45] Date of Patent: Jun. 10, 1997

[54] METHOD AND SYSTEM FOR ALIGNING THE PHASE OF HIGH SPEED CLOCKS IN TELECOMMUNICATIONS SYSTEMS

[75] Inventor: David W. Kuddes, Richardson, Tex.

[73] Assignee: Alcatel Network Systems, Inc., Richardson, Tex.

[21] Appl. No.: 136,339

[22] Filed: Oct. 14, 1993

[51] Int. Cl.$^6$ .................................................. H04L 7/00
[52] U.S. Cl. ........................... 375/357; 375/371; 375/373; 375/376; 327/5; 327/7; 327/12; 327/149; 327/156; 327/161; 327/163
[58] Field of Search ...................... 375/118, 119, 375/120, 357, 371, 373, 374–376; 370/102, 108; 307/510, 511, 514; 328/133; 331/17, 25; 327/12, 3, 24, 5, 7, 149, 156, 161, 163

[56] References Cited

U.S. PATENT DOCUMENTS

| | | | |
|---|---|---|---|
| 4,851,784 | 7/1989 | Wells et al. | 327/12 |
| 4,864,252 | 9/1989 | Heck | 331/1 A |
| 4,902,920 | 2/1990 | Wolaver | 327/12 |
| 4,959,617 | 9/1990 | Martin | 328/133 |
| 5,081,655 | 1/1992 | Long | 375/119 |
| 5,109,394 | 4/1992 | Hjerpe et al. | 375/119 |
| 5,173,617 | 12/1992 | Alsup et al. | 375/119 |
| 5,376,847 | 12/1994 | Staszewski | 327/12 |

*Primary Examiner*—Stephen Chin
*Assistant Examiner*—Amanda T. Le
*Attorney, Agent, or Firm*—Baker & Botts, L.L.P.

[57] ABSTRACT

A method and system are provided for detecting and measuring a phase difference, linearly over a range of 360°, between the output signals from a primary stratum clock module (100) and a standby stratum clock module (120) in a telecommunications system, calculating the amount of time needed to delay the standby clock signal ($\phi2$) enough to cancel the phase difference, and controlling a digital delay line (132) to shift the phase of the standby clock signal ($\phi2$) accordingly and thereby cancel the phase difference. Both the frequency and phase alignments of the two clocks are thus maintained. Therefore, when the system or user switches operations from the primary stratum clock module (100) to the standby stratum clock module (120), phase-related transients are not generated, which results in a significant increase in the overall performance and reliability of the system.

10 Claims, 2 Drawing Sheets

METHOD AND SYSTEM FOR ALIGNING THE PHASE OF HIGH SPEED CLOCKS IN TELECOMMUNICATIONS SYSTEMS

TECHNICAL FIELD OF THE INVENTION

The present invention is concerned generally with high-speed telecommunications systems, and more specifically with techniques for improving the operability and reliability of high-speed telecommunications systems. Even more specifically, the invention is concerned with a method and system for minimizing switching transients in a high-speed telecommunications system by aligning the phase of a primary stratum clock with the phase of a back-up or standby stratum clock prior to switching operational use from the primary clock to the standby clock.

BACKGROUND OF THE INVENTION

Purchasers of telecommunications systems are highly influenced by the reliability of these systems. In fact, for most users of high-speed telecommunications systems, high reliability is essential. Consequently, designers of telecommunications systems commonly use redundant components and circuits to increase the reliability of their systems. For example, if a fault develops in a critical portion of the system, then the redundant component or circuit automatically takes over the function of the faulty portion. Alternatively, and also by way of example, a user may switch an operation to a redundant component or circuit for maintenance purposes. Subsequently, the primary component or circuit may be replaced by a new part. In order to maximize maintainability and minimize fabrication costs, manufacturers of high-speed telecommunications systems typically provide interchangeable primary and redundant components or circuits.

In a known configuration, which will be described in detail below, a plurality of primary stratum clock modules and redundant, "hot standby" stratum clock modules are included in a high-speed telecommunications system. These stratum clock modules are used to provide the clock pulses required to synchronize certain discrete, integrated circuits that make up the system. Typically, the primary and standby stratum clock modules are interchangeable as to both location and function. Consequently, if the quality of a primary clock's signals degrades significantly, or the operation of the primary clock is disrupted, then the system switches operational use over to a standby clock module. If deemed necessary, the user may then replace the defective module with a new module. Given the interchangeability of the primary and standby modules, and the current state of the technology, frequency errors between the primary and standby clock signals can be minimized. Therefore, by providing redundant stratum clock modules, the manufacturer ensures that the operability and reliability of the overall system is increased. However, although the frequencies of the primary and standby clock signals can be aligned to within an acceptable tolerance, a significant phase difference between the two signals can still exist. Consequently, when operations are switched from one clock module to another, if a phase difference between the two clock signals exists, a transient is generated along with the clock signal and propagated throughout the system. So, for a significant period of time after the switching operation, portions of the system will be out of synchronization, and the performance and reliability of the overall system will be degraded.

In a known configuration, an exclusive-or (XOR) gate is included as a phase detector to detect and measure phase differences between high-speed signals. However, under certain conditions, the binary waveforms present at the inputs of the XOR phase detector may overlap for less than a 50% duty cycle, which limits the detection range of such XOR phase detectors to within 180°. Another known phase detector includes a pair of interconnected D-type flip-flops configured to provide a detection range of 360°, but the gain of this circuit becomes nonlinear (i.e., produces a dead band) as the detected phase difference approaches 0° (or 360°). Consequently, the limited performance characteristics and inaccuracies of these phase detectors make them unacceptable for high-speed clock signal, phase-alignment applications.

It is an object of the present invention, therefore, to provide a method and system that accurately detects and measures a phase difference, linearly over a range of 360°, between the output signals from a primary stratum clock module and a standby stratum clock module in a telecommunications system, calculates the amount of time needed to delay the standby clock signal enough to cancel the phase difference, and controls a digital delay line to shift the phase of the standby clock signal accordingly and thereby cancel the phase difference. Both the frequency and phase alignments of the two clocks are thus maintained. Therefore, when the system or user switches operations from the primary stratum clock module to the standby stratum clock module, phase-related transients are not generated, which results in a significant increase in the overall performance and reliability of the system. The present invention achieves this object with minimal additional circuitry.

BRIEF DESCRIPTION OF THE DRAWINGS

Other objects and advantages are apparent and best understood by reference to the following description of illustrative embodiments when read in conjunction with the accompanying drawings, wherein.

DETAILED DESCRIPTION OF THE INVENTION

Figure 1:
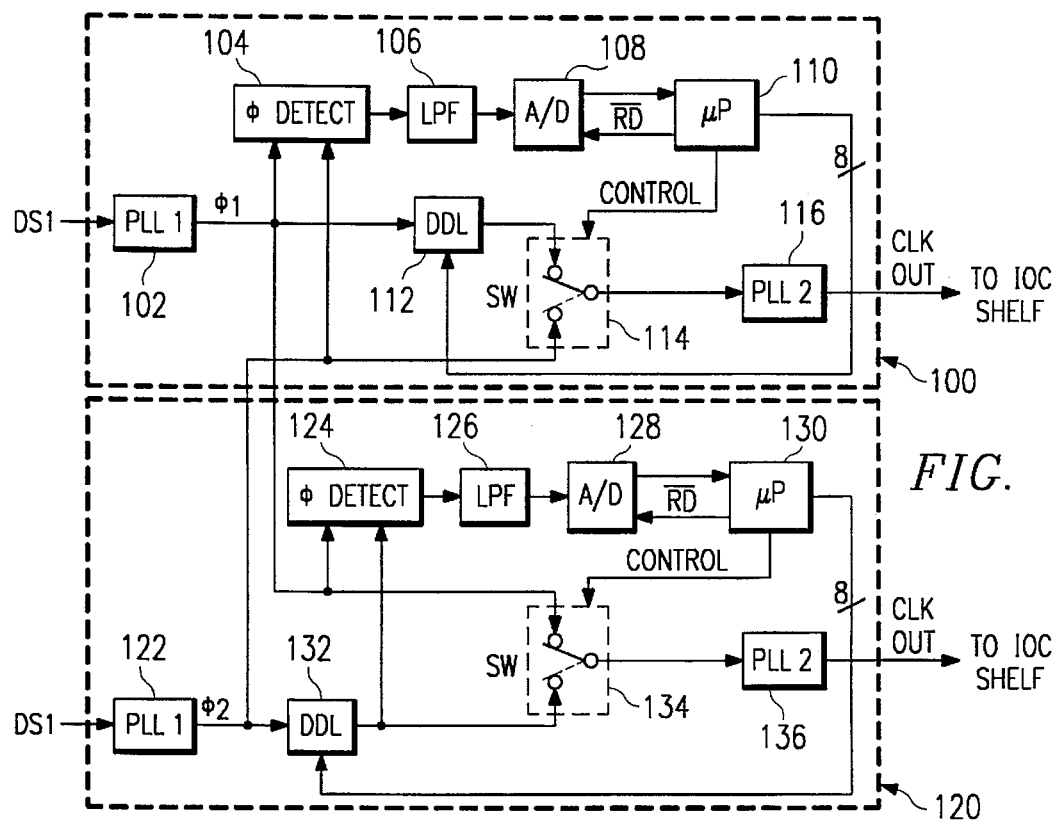
FIG. 1, shows a block diagram of the preferred embodiment.

In FIG. 1, primary stratum clock module 100 and standby clock module 120 for a high-speed telecommunications system are shown. In the preferred embodiment, each module 100 and 120 includes identical circuits and components for ease of manufacturing. However, the invention is not intended to be so limited. Alternatively, only one of modules 100 or 120 need be used to perform phase alignment, since this function may be accomplished by shifting the phase of one clock signal with respect to the other. Furthermore, it is understood that module 100 or 120 may represent either a primary or standby stratum clock module, since the structure and operation of these modules are identical. Selection of a particular clock module to perform the function of either a primary module or standby module is a matter of design choice. In the preferred embodiment, stratum clock module 120 is selected to function as a "hot standby" module (i.e., operating, but in a standby mode) and designated as the "slave". The primary module is thus designated as the "master". Generally, the clock output signal from module 120 is controlled by the interaction of phase-lock loop 122 (PLL1), adjustable, digital delay line (DDL) 132, and phase-lock loop 136 (PLL2). Digital control of the phase-lock loops and the digital delay line is provided by microprocessor 130, which may be, for example, a Motorola 68331 Microprocessor. However, the invention is not intended to be so limited and any known, high-speed digital processor or controller having similar functional capabilities may be substituted for microprocessor 130. Phase detection is performed with a 360° range, duty cycle-insensitive XOR phase detection circuit. Phase alignment is performed by delaying the clock signal in "slave" module 120 enough to cancel any existing phase difference between the "master" and "slave" clock signals. As discussed above, the structure and operation of module 120 is identical to that of module 100. Therefore, the following description will focus on standby module 120 but applies equally to primary module 100.

Specifically, a standard communications signal in a DS1 format is coupled to the inputs of phase-lock loops 102 and 122 on respective modules 100 and 120. Clock signal ø1 is generated at the output of PLL 102, and clock signal ø2 is generated at the output of PLL 122. The specific structures of PLL 102 and 122, and the techniques used to generate clock signals ø1 and ø2 are not needed to understand the concept of the invention. Given the current state of technology, the accuracy of phase-lock loops 102 and 122 are high enough so that clock signals ø1 and ø2 are virtually identical in frequency. However, a significant phase difference between the two clock signals may still exist. The output of PLL 102 is connected to respective inputs of phase detectors 104 and 124, the input of digital delay line 112, and a contact pole of digital switch 134. The output of PLL 122 is connected to the input of digital delay line 132, the second input of phase detector 104, and a contact pole of digital switch 114. The output of digital delay line 112 is connected to the second contact pole of switch 114, while the output of digital delay line 132 is connected to the second contact pole of switch 134, and the second input of phase detector 124. The switching contacts of switches 114 and 134 are connected to the respective inputs of phase-lock loops 116 and 136. The output of phase detector 104 (124) is connected to low pass filter 106 (126), and the output of low pass filter 106 (126) is connected to the input of A/D converter 108 (128). Low pass filters 106 and 126 may be, for example, low-pass RC circuits. The output of A/D converter 108 (128) is coupled to a data input of microprocessor 110 (130), and a control data output of microprocessor 110 (130) is coupled by an 8-bit data bus to a control input of digital delay line 112 (132). By controlling the operation of switches 114 and 134, microcontrollers 110 and 130 may select clock signals ø1 or ø2 as the clock signals to be output from modules 100 or 120. The clock signal outputs of modules 100 and 120 are connected to an input/output control shelf, which is associated with cross-connect circuitry (not explicitly shown). The cross-connect circuits may be associated with either multiplexing or demultiplexing operations to direct the flow of communications data to or from respective optical transmitters or receivers in a high-speed telecommunications system. The clock signal outputs of either module 100 or 120 are used to synchronize the discrete integrated circuits in the cross-connects. In the preferred embodiment, the cross-connects may be designated as an SX 1633, which is a cross-connect manufactured by Alcatel Network Systems, Inc. By applying a control signal to switch 114 (134), microprocessor 110 (130) may select clock signal ø1 or ø2 to provide the clock signal output from module 100 (120).

It is understood that any digitally-controlled, high-speed switching circuit having similar functional capabilities may be substituted for switches 114 or 134. For example, switches 114 or 134 may comprise a high-speed electronic switch formed on a semiconductor integrated circuit chip.

Figure 2:
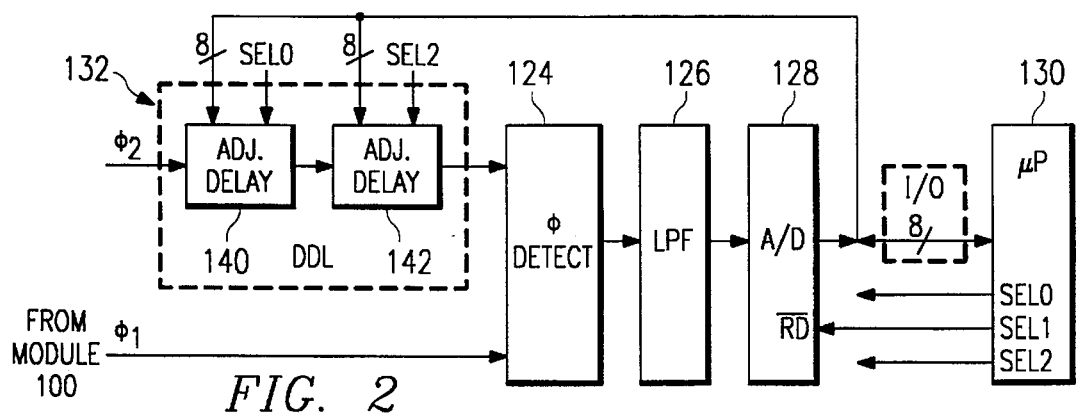
FIG. 2 shows additional details of the phase alignment circuitry depicted in FIG. 1.

FIG. 2 shows additional details of the phase alignment circuitry depicted in FIG. 1. The 8-bit wide I/O data bus of microprocessor 130 is coupled to adjustable delay circuits 140 and 142 in digital delay line 132. In the preferred embodiment, each of adjustable delays 140 and 142 may be designated as an AD 9501, which is an adjustable, digital delay circuit manufactured by Analog Devices. Each of delay circuits 140 and 142 includes eight delay flip-flops, which may be operated in various combinations to produce different time delays. In other words, the overall delay of digital delay line 132 is controlled by the bit patterns of the 8-bit data signal output from microprocessor 130, and the number of adjustable delays selected. The SEL0 output from microprocessor 130 selects adjustable delay 140, while the SEL2 output selects adjustable delay 142. Both adjustable delays may be selected simultaneously by microprocessor 130. Also, in the preferred embodiment, A/D converter 128 may be designated as a 74HC244, which is a digitally-controlled A/D converter manufactured by Analog Devices. The SEL1 output from microprocessor 130 is connected to the read enable input of A/D converter 128. Therefore, the output signal from A/D converter 128 may be read out under the control of the microprocessor.

Figure 3:
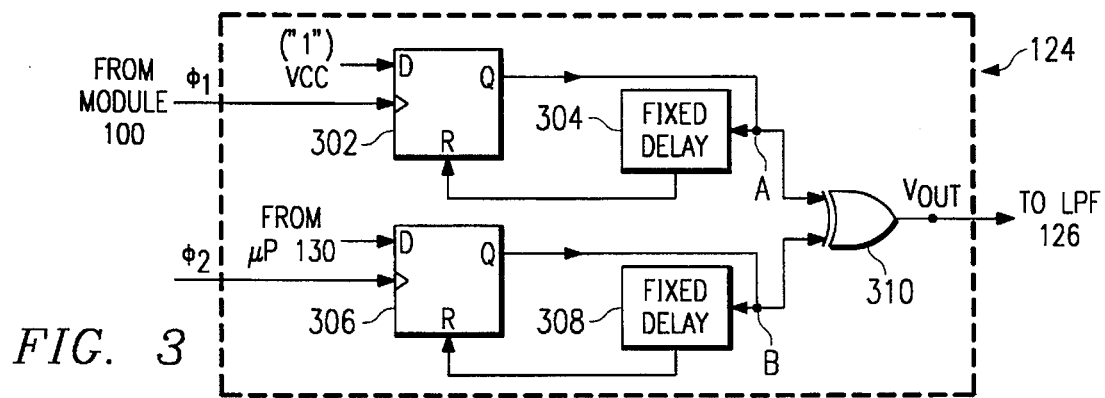
FIG. 3 shows a schematic circuit diagram of the phase detector depicted in FIGS. 1 and 2.
Figure 4A:
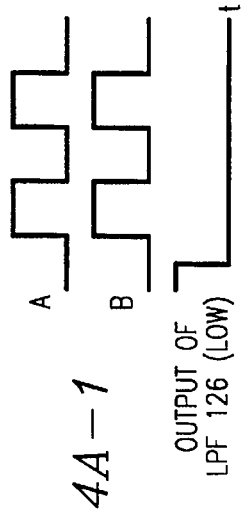
FIG. 4 shows a timing diagram of the waveforms resulting from implementing the preferred embodiment.
Figure 4B:
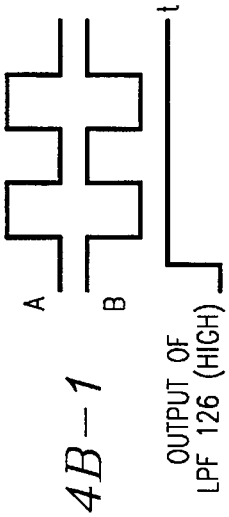
Figure 4C:
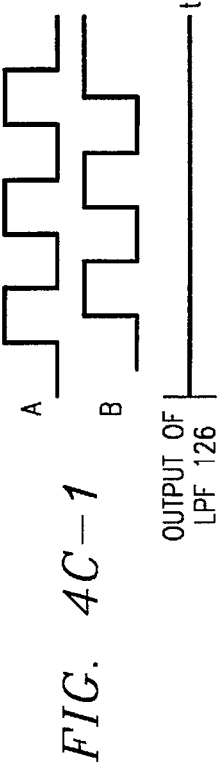
Figure 4D:
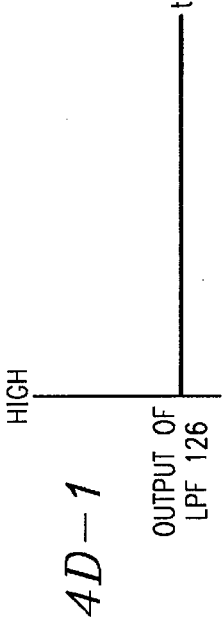
Figures 1, 4A:
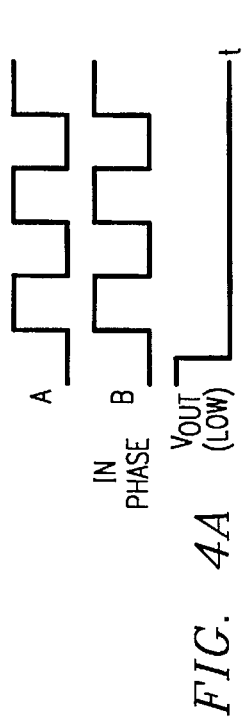
Figures 1, 4B:
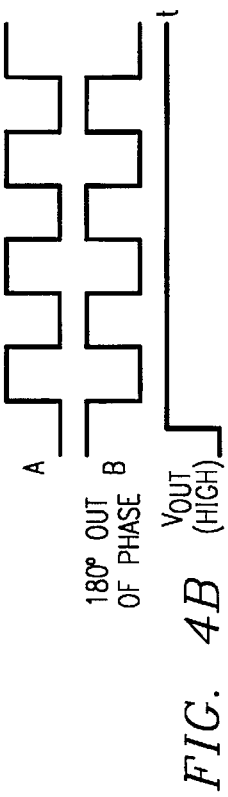
Figures 1, 4C:
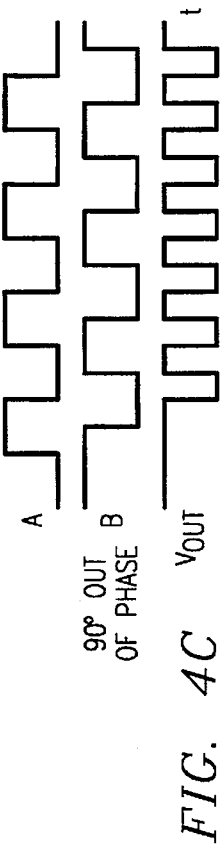
Figures 1, 4D:
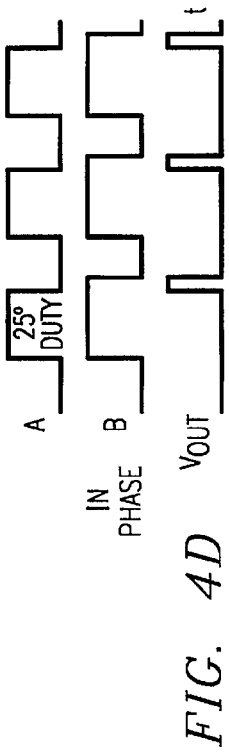

FIG. 3 shows a schematic circuit diagram of the phase detector depicted in FIGS. 1 and 2. In the preferred embodiment, phase detector 124 includes D-type flip flops 302 and 306. The D input of flip flop 302 is connected to Vcc and is always "high". Clock signal ø1 from module 100 is connected to the clock input of flip flop 302, while the Q output of flip flop 302 is connected to node A at an input connection of XOR gate 310. Node A is connected to the input of fixed delay circuit 304, and the output of delay circuit 304 is connected to the reset input of flip flop 302. Clock signal ø2 is connected to the clock input of flip flop 306, while the Q output is connected to node B at the second input connection of XOR gate 310. Node B is connected to the input of fixed delay circuit 308, and the output of delay circuit 308 is connected to the reset input of flip flop 306. The D input of flip flop 306 is connected to a data output connection of microprocessor 130 (connection not explicitly shown).

OPERATION

Having explained generally the structure and processes of the preferred embodiment, the following description shows how the preferred embodiment detects a phase difference between the primary and standby stratum clock signals, and delays the standby clock signal enough to negate any existing phase difference.

Prior to switching over from primary or "master" module 100 to standby ("slave") stratum clock module 120, phase detector 124 operates to detect any phase difference between signals ø1 and ø2. Specifically, referring to FIGS. 1–3, fixed delays 304 and 308 are each designed to provide an approximate one-half period delay, where the period is equal to the inverse of the frequency of signals ø1 and ø2. A bit value of "1" is clocked into the D input of flip flop 306 by microprocessor 130 at the system clock rate, and the D input of flip flop 302 is always held "high". FIG. 4 shows a timing diagram of the waveforms resulting from implementing the present invention. Consequently, referring to FIG. 4, there will always be a valid output signal from gate 310, even if the phase difference between signals ø1 and ø2 is such that the overlap between the two signals exists for less than a 50% duty cycle (e.g., FIG. 4(d)). Therefore, the XOR phase detector of the present invention may operate successfully to detect a phase difference linearly over a 360° range.

The signal at the output of gate 310 is coupled to low pass filter 126, which produces an output voltage according to the transfer function of 1/(1+s). The analog error voltage from low pass filter 126 is converted to a digital signal at A/D converter 128 and coupled to a data input of microprocessor 130. Using the input data from A/D converter 128, microprocessor 130 performs a gradient search to determine the voltage minima. In the preferred embodiment, the gradient search may be performed, for example, by the microprocessor operating on a standard "Fletcher-Powell" gradient search algorithm. Once the voltage minima is determined, microprocessor 130 selects an appropriate delay at digital delay line 132, which operates to shift the phase of clock signal ø2 enough to provide the voltage minima (i.e., zero phase error) at the output of low pass filter 126 and thus A/D converter 128. Alternatively, the voltage minima of the error signal may be determined by the microprocessor operating to read the output signals from A/D converter 128, initially adjusting the delay of digital delay line 132 in small increments, and determining whether or not the phase error is increasing or decreasing as a result. If the phase error signal from A/D converter 128 is increasing, then the microprocessor adjusts the delay of digital delay line 132 in the direction opposite to that of the initial adjustment. The phase error may be deemed cancelled at a predetermined threshold. Microcontroller 130, which is synchronized to operate at the system clock rate, monitors the phase error signal from A/D converter 128 during each system clock cycle, and after the phase error is reduced below the predetermined threshold, controls clock signal selection switch 134 to select signal ø2 as the output clock signal to the IOC shelf, if switching is required. Of course, since clock module 120 is operating in a "hot standby" mode prior to the switching operation, a steady state condition will have been reached by the time frequency ø2 is selected and any phase difference existing between signals ø1 and ø2 will be minimal at the time of the switching operation.

In summary, the invention provides a method and system that accurately detects and measures a phase difference, linearly over a range of 360°, between the output signals from a primary stratum clock module and a standby stratum clock module in a telecommunications system, calculates the amount of time needed to delay the standby clock signal enough to cancel the phase difference, and controls a digital delay line to shift the phase of the standby clock signal accordingly and thereby cancel the phase difference. Both the frequency and phase alignments of the two clocks are thus maintained. Therefore, when the system or user switches operations from the primary stratum clock module to the standby stratum clock module, phase-related transients are not generated, which results in a significant increase in the overall performance and reliability of the system.

As a result of the above, although the invention has been described with reference to the above embodiments, its description is not meant to be construed in a limiting sense. Various modifications of the disclosed embodiment, as well as alternative embodiments of the invention will become apparent to persons skilled in the art upon reference to the above description. It is therefore contemplated that the appended claims will cover such modifications that fall within the true scope of the invention.

What is claimed is:

1. A method for negating a phase difference between clock signals in a high-speed telecommunications system, comprising the steps of:

detecting the phase difference between a first clock signal and at least a second clock signal, linearly over a range between and including 0 and 360 degrees;

calculating the time required to delay the second clock signal by an amount required to negate said phase difference; and shifting the phase of said second clock signal in correspondence with the calculated amount.

2. A system for negating a phase difference between a plurality of clock signals in a high-speed telecommunications system, comprising:

a first circuit operable to detect a phase difference linearly, over a range between and including 0 and 360 degrees, between a first clock signal and at least a second clock signal;

a second circuit coupled to said first circuit and operable to generate an error signal at an output corresponding to said phase difference; and a third circuit coupled to said output of said second circuit and operable to shift the phase of said second clock signal and thereby minimize said error signal.

3. The system of claim 2, wherein said first circuit comprises an XOR phase detection circuit.

4. The system of claim 2, wherein said third circuit comprises a digital delay line.

5. A method for aligning the phase of a plurality of high-speed frequency-synchronous clock signals, comprising the steps of:

detecting the phase of a first high-speed clock signal and the phase of at least a second high-speed clock signal;

generating an error signal corresponding to a difference between the phase of said first clock signal and the phase of said second clock signal, linearly over a range between and including 0 and 360 degrees;

calculating the time required to shift the phase of said second clock signal by an amount required to cancel the error signal; and delaying said second clock signal by the required amount.

6. A system for aligning the phase of a plurality of high-speed frequency-synchronous clock signals, comprising:

clock generator circuitry operable to generate a first high-speed clock signal;

phase detector circuitry operable to detect a phase difference between said first clock signal and at least a second high-speed clock signal, linearly over a range between and including 0 and 360 degrees;

error signal generating circuitry connected to said phase detector circuitry and operable to generate an error signal corresponding to said phase difference between said first high-speed clock signal and said at least second high-speed clock signal;

processing circuitry operable to receive said error signal and calculate the time required to shift the phase of said first high-speed clock signal by an amount required to cancel the error signal; and time delay circuitry operable to shift the phase of said first high-speed clock signal responsive to said calculated amount.

7. The system of claim 6, wherein said clock generator circuitry comprises a phase-locked loop circuit.

8. The system of claim 6, wherein said phase detector circuitry comprises an XOR phase detector circuit.

9. The system of claim 6, wherein said processing circuitry comprises a microprocessor.

10. The system of claim 6, wherein said time delay circuitry comprises a digital delay line.

* * * * *